(No Model.)

J. W. HYATT.
ANTI-FRICTION JOURNAL BEARING.

No. 385,267. Patented June 26, 1888.

Attest:
L. Lee,
F. C. Fischer.

Inventor.
John W. Hyatt, per
Crane & Miller, Attys.

UNITED STATES PATENT OFFICE.

JOHN W. HYATT, OF NEWARK, NEW JERSEY.

ANTI-FRICTION JOURNAL-BEARING.

SPECIFICATION forming part of Letters Patent No. 385,267, dated June 26, 1888.

Application filed January 9, 1888. Serial No. 260,117. (No model.)

*To all whom it may concern:*

Be it known that I, JOHN W. HYATT, a citizen of the United States, residing at Newark, Essex county, New Jersey, have invented certain new and useful Improvements in Anti-Friction Journal-Bearings, fully described and represented in the following specification and the accompanying drawings, forming a part of the same.

The object of this invention is to utilize thin washers or disks in the construction of an anti-friction journal-bearing, such disks being very readily produced from steel by the process of punching, and thus secured at a lower cost than by any other means. By wholly surrounding a journal inside a cylindrical casing with such disks the load imposed upon the journal is distributed over many points of contact, and is as well if not better sustained than if held upon single anti-friction rollers arranged in a single series around the journal and extending its entire length. If such disks required sustaining within the casing by pivoted connection to a rotary collar or flange, the advantages of their use (in point of economy) would be wholly neutralized; and my invention consists in combining loose intermediate washers with separate series of such loose disks, the washers being made thin, as of sheet metal, and inserted between the series of disks at suitable intervals to hold them parallel with the end flanges of the casing. The disks are thus guided in a continuous path around the journal, and are held from tipping in any direction or jamming against one another.

The invention may be applied to any bearing for which it is adapted, and is shown in the annexed drawings embodied in a shafting-pedestal and in a wagon axle box.

Figure 1:
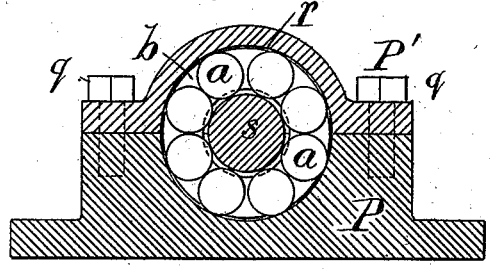
Figures 3, 4:
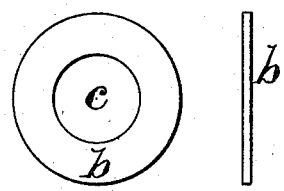
Figures 5, 6:
Figure 2:
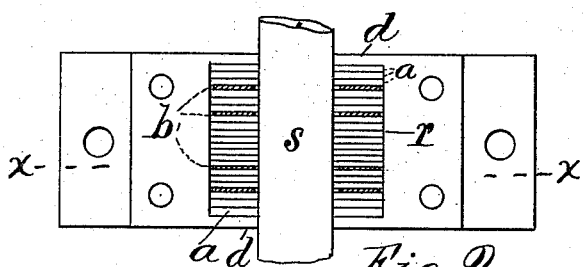
Figure 7:
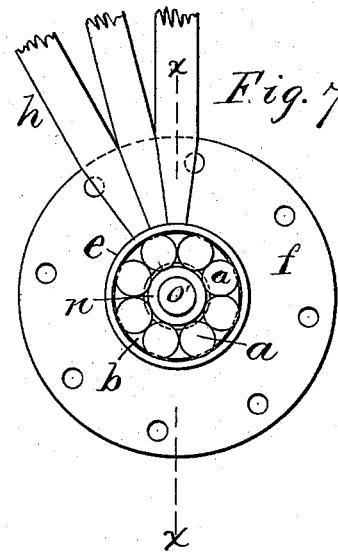
Figure 8:
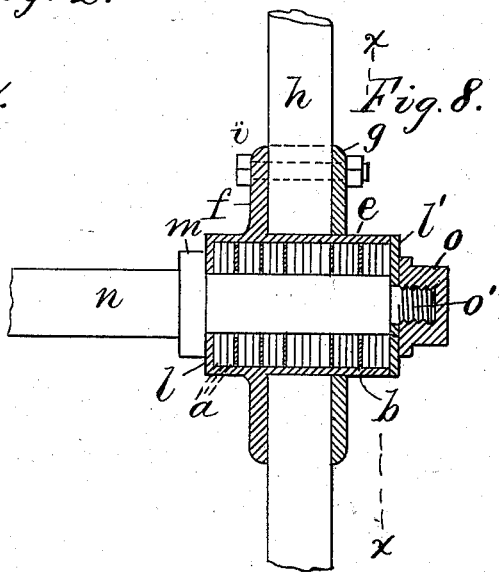

Figure 1 is a longitudinal section of a shafting-pedestal on line *x x* in Fig. 2. Fig. 2 is a plan of the lower half of the same. Fig. 3 is a side view, and Fig. 4 an edge view, of one of the guiding-washers detached; and Figs. 5 and 6 are a side and edge view, respectively, of one of the anti-friction disks drawn twice as large as those shown in Fig. 1. Fig. 7 shows an end view of a wagon axle and hub provided with anti-friction rolls, the loose flange *g* for the spokes (which is shown in Fig. 8) being omitted, as well as most of the spokes, and the flange *l'* at the front end of the hub, which would otherwise conceal the rolls; and Fig. 8 is a longitudinal section of the hub and box on line *x x* in Fig. 7.

P is the shafting-pedestal, with cap P' secured thereto by bolts *q*, the pedestal and cap being bored with a recess, *r*, adapted to form a casing concentric with the shaft *s*, and closed at opposite ends by annular flanges *d*.

*a* are the anti-friction disks, which may be made of any material, and are shown of such thinness that they would not accurately retain their required parallel position if inserted in a large number between the shaft and the casing without extraneous support.

*b* are thin washers with central apertures, *c*, adapted to fit around the shaft *s* at intervals between the several series of loose disks, as shown at *b b* in Fig. 2. The washers are preferably made a little smaller than the casing, as shown in Fig. 1, so as to turn freely therein if moved by the contact of the disks, and the washers operate to divide the space between the end flanges, *d*, into a series of narrow compartments, in which the loose disks rotate freely around the shaft in independent series.

In Figs. 7 and 8 the invention is shown applied to a metallic hub, *e*, for a wagon-wheel, the hub being provided with fixed flange *f* and loose flange *g*, to which the spokes *h* would be clamped by bolts *i*.

The hub is bored to form the required recess, and is provided at the inner end with fixed annular flange *l* to bear against the collar *m* upon the axle *n*, only one end of the axle being shown with the parts that are fitted to the axle-box. The front of the recess is shown provided with a removable flange, *l'*, held in place by a nut, *o*, upon the thread *o'* at the outer end of the axle. The anti-friction disks *a* are shown divided into several groups of three, four, and six series, with the loose washers *b* inserted between the disks of such groups. The operation of the loose disks and washers is the same in the wagon-axle box and the pedestal shown in Fig. 1, the several series of disks being held in the required path by the flat surfaces of the intermediate washers. Such disks and washers may be readily formed of suitable metal by punching them from flat sheets of the desired metal, smooth sheets being used, and the disks and washers being preferably rolled in a tumbling-barrel to remove the burrs and smooth all the corners. By the use of such means the disks and washers may be produced with great cheapness, so as to form an efficient anti-friction bearing for many purposes at a very slight expense.

The washers may be alternated with each series of disks, if desired; but if several series of disks are placed in contact with one another, as shown in the drawings, I disclaim my patent application, Serial No. 260,116, filed January 9, 1888, in which I have claimed any construction containing separate series of loose roll-sections held in a casing in lateral contact with one another.

From the above description it will be seen that the essential feature of my invention is the combination of several series of disks, $a$, with washers $b$ for separating the same from each other, and it is therefore immaterial whether flanges be applied at each end of the casing in which the rolls operate to hold the same in place or whether collars be applied to the ends of the journals for such purpose.

I am aware of Patent No. 81,860, dated September 1, 1868, in which a pulley-block is shown provided with two series of rolls or disks separated by a flange fixed rigidly in the casing and held in the casing by the cheeks of the pulley. With such construction only two series of rolls could be used, and my invention differs from the same in its adaptability to long bearings, which would require many series of rolls which would not retain their position or perform their functions within the casings when made of thin sheet metal unless they were guided at intervals by intermediate washers. In my invention the washers are entirely loose, and the disks and washers are both designed to be stamped from thin sheet metal to form a cheap construction. I therefore disclaim the said Patent No. 81,860, and limit my invention to a construction in which many series of thin disks are used with intermediate washers entirely loose from the shaft or casing.

Having thus set forth my invention, what I claim herein is—

1. The combination, in an anti-friction bearing, of a casing formed concentric with the journal, loose disks fitted within the casing around the journal in separate independent series, loose washers surrounding the journal and inserted between the separate series of disks, and means, substantially as described, at the ends of the casing for holding the loose disks in place, as and for the purpose set forth.

2. The combination, in an anti-friction bearing, of a casing formed concentric with the journal and provided with flanges at its ends, a series of loose washers inserted within the casing around the journal, and separate series of loose disks inserted within the casing alternately with the washers, as and for the purpose set forth.

In testimony whereof I have hereunto set my hand in the presence of two subscribing witnesses.

JOHN W. HYATT.

Witnesses:
L. LEE,
THOS. S. CRANE.